(12) United States Patent
Ferrari

(10) Patent No.: US 7,774,949 B2
(45) Date of Patent: Aug. 17, 2010

(54) COORDINATE MEASUREMENT MACHINE

(75) Inventor: Paul Ferrari, Carlsbad, CA (US)

(73) Assignee: Hexagon Metrology AB, Nacka Strand (SE)

( * ) Notice: Subject to any disclaimer, the term of this patent is extended or adjusted under 35 U.S.C. 154(b) by 128 days.

(21) Appl. No.: 11/864,392

(22) Filed: Sep. 28, 2007

(65) Prior Publication Data

US 2009/0083985 A1    Apr. 2, 2009

(51) Int. Cl.
G01B 5/004    (2006.01)
(52) U.S. Cl. ............................................. 33/503
(58) Field of Classification Search ............ 33/503
See application file for complete search history.

(56) References Cited

U.S. PATENT DOCUMENTS

| | | |
|---|---|---|
| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,396,712 A | 3/1995 | Herzong |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A | 6/1998 | Raab |
| 5,822,450 A | 10/1998 | Arakawa et al. |
| 5,829,148 A | 11/1998 | Eaton |
| 5,978,748 A | 11/1999 | Raab |
| 5,991,704 A | 11/1999 | Rekar et al. |
| 6,134,506 A | 10/2000 | Rosenberg et al. |
| 6,161,079 A | 12/2000 | Zink et al. |
| 6,219,928 B1 | 4/2001 | Raab et al. |
| 6,366,831 B1 | 4/2002 | Raab |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |

(Continued)

FOREIGN PATENT DOCUMENTS

DE    4345091 A1    7/1995

(Continued)

Primary Examiner—Amy Cohen Johnson
(74) Attorney, Agent, or Firm—Knobbe, Martens, Olson & Bear LLP

(57) ABSTRACT

A portable coordinate measurement machine having three articulating arm transfer members can provide accurate measurements. The transfer members can be single tube assemblies. The transfer members can each be rotatably joined by relatively short articulating joint assemblies allowing relative rotation of adjacent transfer members about two degrees of freedom. Encoders can be used to measure the relative rotation about each of the degrees of freedom, and signals from the encoders can be digitized by processor boards positioned within the transfer members. Processor boards can be placed in tandem in the transfer members, and one or more of the processor boards can be mounted on a rotatable assembly. Slip rings can electrically couple all of the processor boards to allow for infinite rotatability of the articulating arm.

17 Claims, 7 Drawing Sheets

U.S. PATENT DOCUMENTS

| | | |
|---|---|---|
| 6,668,466 B1 | 12/2003 | Bieg |
| 6,817,108 B2 | 11/2004 | Eaton |
| 6,892,465 B2 | 5/2005 | Raab et al. |
| 6,904,691 B2 | 6/2005 | Raab et al. |
| 6,920,697 B2 * | 7/2005 | Raab et al. .................... 33/503 |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,073,271 B2 | 7/2006 | Raab et al. |
| 7,152,456 B2 | 12/2006 | Eaton |
| 7,174,651 B2 | 2/2007 | Raab et al. |
| 7,246,030 B2 | 7/2007 | Raab et al. |
| 7,269,910 B2 | 9/2007 | Raab et al. |
| 7,296,979 B2 | 11/2007 | Raab et al. |
| 7,372,581 B2 | 5/2008 | Raab et al. |
| 7,395,606 B2 | 7/2008 | Crampton |
| 2007/0063500 A1 | 3/2007 | Eaton |
| 2009/0013547 A1 * | 1/2009 | Ferrari et al. ................. 33/503 |

FOREIGN PATENT DOCUMENTS

| | | |
|---|---|---|
| DE | 101 12 977 | 11/2002 |
| EP | 0522610 A1 | 6/1992 |
| FR | 2740546 | 1/1998 |
| GB | 2274526 A | 7/1994 |
| JP | 404057690 | 2/1992 |
| JP | 04-032393 | 5/1992 |
| JP | 05-031685 | 2/1993 |
| JP | 2003-021133 | 1/2003 |
| JP | 2003/175484 | 9/2003 |
| JP | 2003275484 | 9/2003 |
| JP | 2006-214559 | 8/2006 |
| WO | WO 98/08050 | 2/1998 |

* cited by examiner

COORDINATE MEASUREMENT MACHINE

BACKGROUND OF THE INVENTION

1. Field of the Invention

The present application relates to measuring devices, and more particularly, to articulated arm coordinate measurement machines for measuring coordinates in three-dimensions.

2. Description of the Related Art

Rectilinear measuring systems, also referred to as coordinate measuring machines (CMM's) and articulated arm measuring machines, are used to generate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measurement sphere of the device.

Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by a user to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651.

As mentioned above, the purpose of PCMM's is to take highly accurate measurements. As compared to stationary CMM'S, the challenge of taking highly accurate measurements is more difficult because PCMM's must also be portable, lightweight, and rugged so as to withstand the wear and tear associated with movement of the device. Accordingly, there is a continuing need to improve such devices. An example of a PCMM arrangement that has been successful can be found in U.S. Pat. No. 5,829,148 and the PCMM sold by ROMER under the tradename INFINITE® CMM. Such devices also advantageously provide infinite rotation about one or more joints of the device. In contrast, prior designs, carried wiring in the joint for transmitting power and signals to and from the probe and transducers. Although the wiring was flexible, the rotational freedom of the joints were restricted to prevent over-coiling. Infinite rotation eliminated the problem associated with the past designs. While the above references designs with infinite rotation have been successful, there is a general need to provide infinite rotation in a PCMM in a manner that can result in a decrease manufacturing and inventory costs while still maintaining and/or exceeding commercially required standards of accuracy.

SUMMARY OF THE INVENTION

In one embodiment, a coordinate measuring machine is disclosed comprising a first transfer member, a second transfer member, a probe, a first joint assembly, a second joint assembly, a first board assembly, and a first processor board. The first joint assembly rotatably couples the first transfer member to the probe and defines at least one axis of rotation. The first joint assembly comprises an encoder for each of the at least one axes of rotation. The encoder is configured to generate a signal corresponding to rotation of the first joint assembly about the axis of rotation. The second joint assembly rotatably couples the first transfer member to the second transfer member and defines at least one axis of rotation. The second joint assembly comprises an encoder for each of the at least one axes of rotation. The encoder is configured to generate a signal corresponding to rotation of the second joint assembly about the axis of rotation. The first board assembly is positioned in the first transfer member. At least a portion of the board assembly is rotatable relative to the first transfer member. The first processor board is mounted on the rotatable portion of the board assembly. The processor board is adapted to receive the signal generated by one of an encoder of the first joint assembly and an encoder of the second joint assembly and to process said signal.

In other embodiments, a transfer member for a coordinate measurement machine comprises a generally tubular member and a board assembly mounted within the tubular member. The board assembly comprises a first board support, a second board support, and a slip ring. The first board support is adapted to receive a printed circuit board. The second board support is adapted to receive a printed circuit board and is rotatably coupled to the first board support. The slip ring electrically couples the first board support to the second board support.

In other embodiments, a coordinate measurement machine comprises a probe, a first transfer member, a first joint assembly, a second transfer member, a second joint assembly, a third transfer member, a third joint assembly, a base, a first processor board assembly, and a second processor board assembly. The first joint assembly rotatably couples the probe to the first transfer member. The first joint assembly comprises at least one encoder configured to generate a signal corresponding to a degree of rotation of the first joint assembly. The second joint assembly rotatably couples the first transfer member to the second transfer member. The second joint assembly comprises at least one encoder configured to generate a signal corresponding to a degree of rotation of the second joint assembly. The third joint assembly rotatably couples the first transfer member to the second transfer member. The second joint assembly comprises at least one encoder configured to generate a signal corresponding to a degree of rotation of the second joint assembly. The base is coupled to the third transfer member. The first processor board assembly is positioned within the first transfer member. The first processor board assembly comprises a first processor board operatively coupled to the encoder of the first joint assembly and a second processor board operatively coupled to the encoder of the second joint assembly. The second processor board assembly is positioned within the second transfer member. The second processor board assembly comprises a third processor board operatively coupled to the encoder of the third joint assembly.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following Figures.

DETAILED DESCRIPTION OF THE PREFERRED EMBODIMENTS

Figure 1:
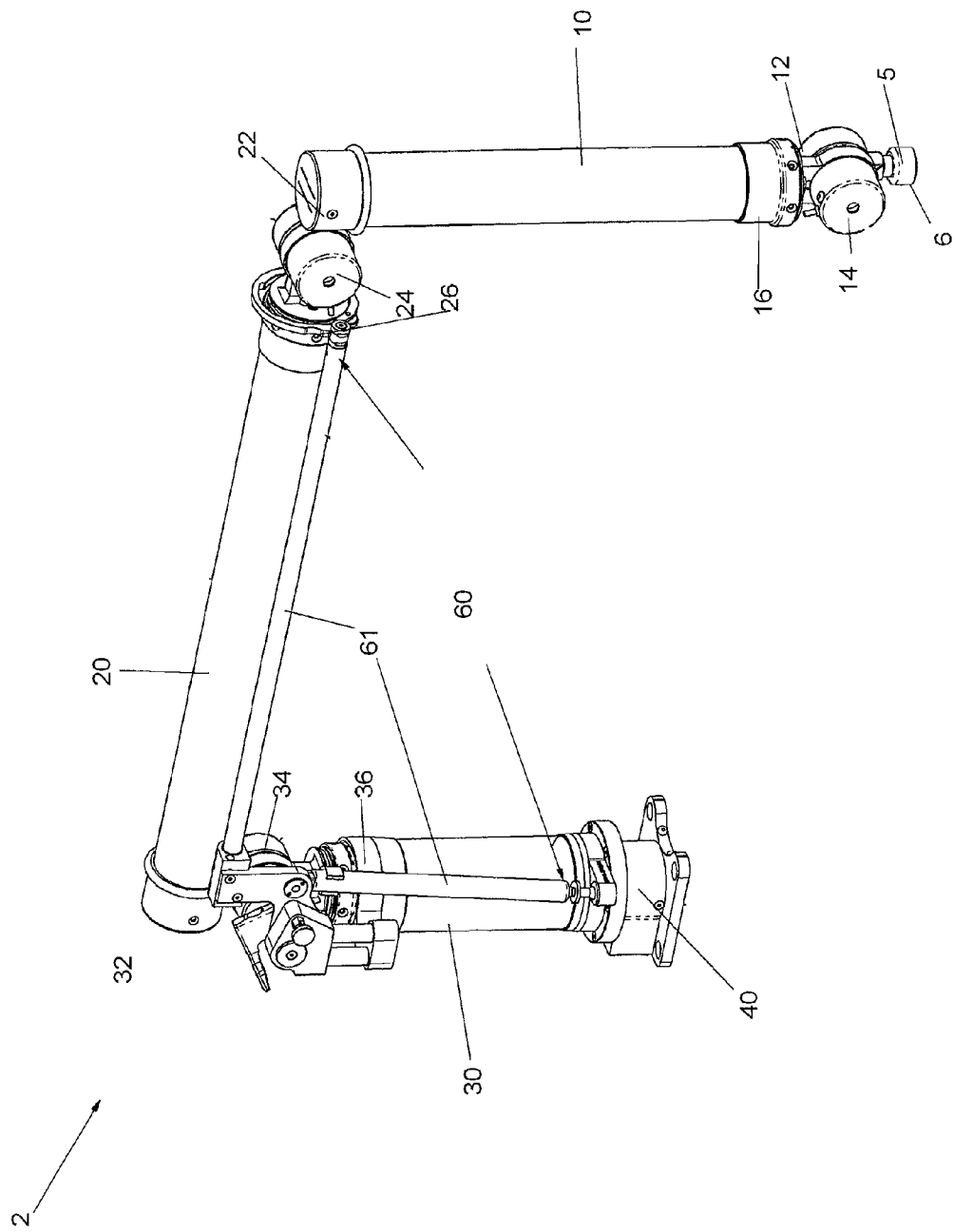
FIG. 1 is a perspective view of one embodiment of coordinate measuring machine.

FIG. 1 illustrates one embodiment of a coordinate measuring machine (PCMM) 2. In the illustrated embodiment, the PCMM 2 comprises a base 40, a plurality of substantially rigid, transfer members 10, 20, and 30, a coordinate acquisition member 5, and a plurality of joint assemblies 22, 32 connecting the rigid transfer members 10, 20, 30 to one another. Each articulation joint assembly 22, 32 is configured to impart one or more rotational and/or angular degrees of freedom. The articulation members 22, 32 allow the transfer members 10, 20, 30 of the PCMM 2 to be aligned in various spatial orientations. Another joint assembly 12 can couple the coordinate acquisition member 5 to transfer member 10, thereby allowing fine positioning of a coordinate acquisition member 5 in three-dimensional space.

The position of the rigid transfer members 10, 20, 30 and the coordinate acquisition member 5 may be adjusted manually, or using, robotic, semi-robotic, and/or any other adjustment method. In one embodiment, the PCMM 2, through the various joint assemblies 12, 22, 32, is provided with six rotary axes of movement. Each joint assembly 12, 22, 32, thus allows movement about two rotational axes. However, there is no strict limitation to the number or order of axes of movement that may be used, and, in other embodiments, a PCMM can have more or fewer axes of movement.

In the embodiment of PCMM 2 illustrated in FIG. 1, the articulating joint assemblies 12, 22, 32 each include two joints 14, 16, 24, 26, 34, 36. These articulating joints 14, 16, 24, 26, 34, 36 can be divided into two functional groupings based on their operation, namely: 1) those articulating joints 16, 26, 36 which allow the swiveling motion associated with a specific transfer member (hereinafter, "swiveling joints"), and 2) those articulation members 14, 24, 34 which allow a change in the relative angle formed between two adjacent members or between the coordinate acquisition member 5 and its adjacent member (hereinafter, "hinge joints"). While the illustrated embodiment includes three swiveling joints and three hinge joints positioned as to create six axes of movement, it is contemplated that in other embodiments, the number of and location of hinge joints and swiveling joints can be varied to achieve different movement characteristics in a PCMM. For example, a substantially similar device with seven axes of movement could simply have an additional swivel joint between the coordinate acquisition member 5 and articulation member 10.

The coordinate acquisition member 5 can comprise a contact sensitive member or hard probe 6 configured to engage surfaces of a selected object and/or generate coordinate data on the basis of probe contact as is known in the art. Alternatively, the coordinate acquisition member 5 can comprise a remote scanning and detection component that does not necessarily require direct contact with the selected object to acquire geometry data. In one embodiment, a laser coordinate detection device (e.g., laser camera) can be used to obtain geometry data without direct object contact. It will be appreciated that in various embodiments of PCMM, various coordinate acquisition member 5 configurations can be used including: a contact-sensitive probe, a remote-scanning probe, a laser-scanning probe, a laser distance probe, an optical probe, a probe that uses a strain gauge for contact detection, a probe that uses a pressure sensor for contact detection, a probe that used an infrared beam for positioning, and/or a probe configured to be electrically-responsive can be used for the purposes of coordinate acquisition.

With continued reference to FIG. 1, in various embodiments of the PCMM 2, the various devices which may be used for coordinate acquisition, such as the probe 6, may be configured to be manually disconnected and reconnected from the PCMM 2 such that a user can change coordinate acquisition devices without specialized tools. Thus, a user can quickly and easily remove one coordinate acquisition device and replace it with another coordinate acquisition device. Such a connection may comprise any quick disconnect or manual disconnect device. This rapid connection capability of a coordinate acquisition device can be particularly advantageous in a PCMM 2 that can be used for a wide variety of measuring techniques (e.g. measurements requiring physical contact of the coordinate acquisition member with a surface followed by measurements requiring only optical contact of the coordinate acquisition member) in a relatively short period of time.

With continued reference to FIG. 1, the transfer members 10, 20, and 30 are preferably constructed of hollow generally cylindrical tubular members so as to provide substantial rigidity to the members 10, 20, and 30. The transfer members 10, 20, and 30 can be made of any suitable material which will provide a substantially rigid extension for the PCMM 2. As will be discussed in greater detail below, in the illustrated embodiment the transfer members 10, 20 each comprise a single-walled generally cylindrical tube assembly. Advantageously, a single walled-tube can have a relatively light weight and be relatively low cost to manufacture and assemble. Transfer member 30 comprises two coaxially-nested tubular members. This double-walled tube assembly can provide additional rigidity to the transfer member nearest the base, which can encounter the highest loading of the transfer members. In other embodiments, all of the transfer members 10, 20, 30 can be single tubular assemblies, or two or more of the transfer members can comprise double-walled nested tubes. Furthermore, it is contemplated that the transfer members 10, 20, and 30 in various other embodiments can be made of alternate shapes such as those comprising a triangular or octagonal cross-section.

In some embodiments, it can be desirable to use a composite material, such as a carbon fiber material, to construct at least a portion of the transfer members 10, 20, and 30. In some embodiments, other components of the PCMM 2 can also comprise composite materials such as carbon fiber materials. Constructing the transfer members 10, 20, 30 of composite such as carbon fiber can be particularly advantageous in that the carbon fiber can react less to thermal influences as compared to metallic materials such as steel or aluminum. Thus, coordinate measurement can be accurately and consistently performed at various temperatures. In other embodiments, the transfer members 10, 20, 30 can comprise metallic materials, or can comprise combinations of materials such as metallic materials, ceramics, thermoplastics, or composite materials. Also, as will be appreciated by one skilled in the art, many of the other components of the PCMM 2 can also be made of composites such as carbon fiber. Presently, as the manufacturing capabilities for composites are generally not as precise when compared to manufacturing capabilities for metals, generally the components of the PCMM 2 that require a greater degree of dimensional precision are generally made of a metals such as aluminum. It is foreseeable that as the manufacturing capabilities of composites improved that a greater number of components of the PCMM 2 can be also made of composites.

With continued reference to FIG. 1, some embodiments of the PCMM 2 may also comprise a counterbalance system 60 that can assist a user by mitigating the effects of the weight of the transfer members 20 and 30 and the articulating members 44, 46, 48, and 50. In some orientations, when the transfer members 20 and 30 are extended away from the base 40, the weight of the transfer members 20 and 30 can create difficulties for a user. Thus, a counterbalance system 60 can be particularly advantageous to reduce the amount of effort that a user needs to position the PCMM for convenient measuring. In some embodiments, the counterbalance system 60 can comprise resistance units, such as tubular gas-filled shock absorbers 61, which are configured to ease the motion of the transfer members 20 and 30 without the need for heavy weights to cantilever the transfer members 20 and 30. It will be appreciated by one skilled in the art that in other embodiments simple cantilevered counterweights can be used in place or in combination with resistance units.

In the embodiment illustrated in FIG. 1, the resistance units 61 are attached to the transfer member 20 to provide assisting resistance for motion of the transfer members 10 and 20 and transfer member 30 to provide assisting resistance for motion of the transfer members 20 and 30. As mentioned above, in the illustrated embodiments, the resistance units 61 comprise tubular gas-filled shock absorbers 61. In some embodiments, the resistance units 61 can comprise hydraulic resistance units which use fluid resistance to provide assistance for motion of the transfer members. In other embodiments the resistance units 61 may comprise other resistance devices such as pneumatic resistance devices, or linear or rotary spring systems.

With continued reference to FIG. 1, the position of the probe 6 in space at a given instant can be calculated if the length of each transfer member 10, 20, and 30 and the specific position of each of the articulating joints 14, 16, 24, 26, 34, 36 are known. The position of each of the articulating joints 14, 16, 24, 26, 34, 36 can be measured as a singular rotational degree of motion using a dedicated rotational transducer, which will be described in more detail below. Each transducer can output a signal (e.g., an electrical signal), which can vary according to the movement of the articulating joint 14, 16, 24, 26, 34, 36 in its degree of motion. The signal can be carried through wires or otherwise transmitted to the base 40 of the PCMM 2. From there, the signal can be processed and/or transferred to a computer for determining the position of the probe 6 in space.

In some embodiments of PCMM 2, a rotational transducer for each of the articulating joints 14, 16, 24, 26, 34, 36 can comprise an optical encoder. The articulating joint assemblies 12, 22, 32 are discussed in more detail below with reference to FIGS. 3-5. In general, an optical encoder measures the rotational position of an axle by coupling its movement to a pair of internal hubs having successive transparent and opaque bands. In such embodiments, light can be shined through or reflected from the hubs onto optical sensors which feed a pair of electrical outputs. As the axle sweeps through an arc, the output of an analog optical encoder can be substantially two sinusoidal signals which are 90 degrees out of phase. Coarse positioning can be determined through monitoring a change in polarity of the two signals. Fine positioning can be determined by measuring an actual value of the two signals at a specific time. In certain embodiments, enhanced accuracy can be obtained by measuring the output precisely before it is corrupted by electronic noise. Thus, digitizing the position information before it is sent to the processor or computer can lead to enhanced measurement accuracy.

While several embodiment and related features of a PCMM 2 have been generally discussed herein, additional details and embodiments of PCMM 2 can be found in U.S. Pat. Nos. 5,829,148 and 7,174,651, the entirety of these patents are hereby incorporated by reference herein. While certain features below are discussed with reference to the embodiments of PCMM 2 described above, it is contemplated that they can be applied in other embodiments of PCMM such as those described in U.S. Pat. No. 5,829,148 or 7,174,651, or some other pre-existing PCMM designs, or PCMM designs to be developed.

Figure 2:
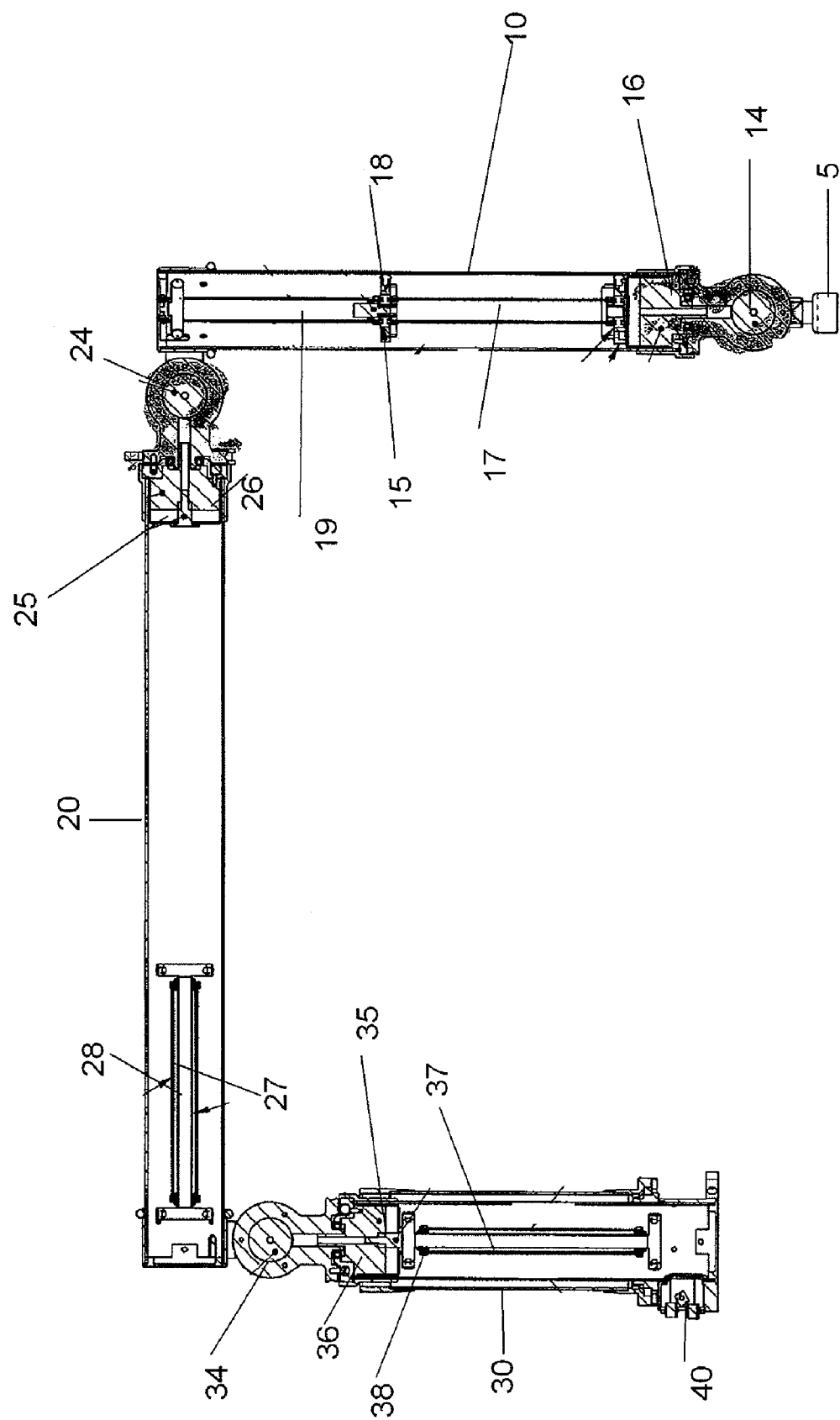
FIG. 2 is cross-sectional view of an articulating arm assembly of the coordinate measuring machine of FIG. 1.

With reference to FIG. 2, a cross sectional view of the PCMM 2 of FIG. 1 is illustrated. As noted above, the rotational position of each articulating joint 14, 16, 24, 26, 34, 36 can be measured with an encoder and, and the resulting signals processed to calculate the position of the probe 6. Where the encoders each generate an analog signal, it can be desirable to digitize the signal before it is transmitted from the encoder to a processor, such as a general purpose computer, away from the PCMM 2. This digitization reduces the risk of signal attenuation during transmission over long distances, possibly spanning all three transfer members 10, 20, 30, of the PCMM 2. Also, in some embodiments of PCMM 2, it is desirable that the transfer members 10, 20, 30 be freely infinitely rotatable with respect to one another. Accordingly, in some embodiments, slip rings 15, 25, 35 can be used to transmit electrical signals from the encoders, along the PCMM 2, while allowing infinite rotation of the transfer members 10, 20, 30. Where slip rings 15, 25, 35 are used to transmit signals through a rotating assembly such as an articulating joint assembly 12, 22, 32, it can be desirable to digitize an encoder's generated signal upstream of the slip ring.

In the illustrated embodiment, processor boards 17, 19, 27, 37, such as printed circuit boards are positioned within the transfer members 10, 20, 30. In the illustrated embodiment, the processor boards 17, 19, 27, 37, can be positioned on a processor board assembly 18, 28, 38. One embodiment of processor board assembly 18 is discussed herein in greater detail with respect to FIGS. 6-7. In some embodiments, the processor boards 17, 19, 27, 37 are adapted to digitize analog signals.

In the illustrated embodiment, each processor board 17, 19, 27, 32 is adapted to digitize analog signals from each of two encoders. In the illustrated embodiment, encoders for each of the articulating joints 14, 16, 24, 26 are electrically connected to the processor boards 17, 19, 27, 37 such that there are no more than two encoders having signals processed by one processor board and such that no analog signal is transmitted through a slip ring.

In one embodiment, it can be desirable to digitize position data from a first articulating joint 14 on a first processor board 17, positioned on a board assembly 18 in the first transfer member 10. As described in further detail below, the first processor board 17 can be rotatable with respect to the first transfer member 10 such that no slip ring is present between the first articulating joint 14 and the first processor board 17.

Position data from a second articulating joint 16 and a third articulating joint 24 can be digitized on a second processor board 19, also positioned on the first board assembly 18 in the first transfer member 10. The second processor board can be rotationally fixed with respect to the first transfer member 10. Accordingly, a first slip ring 15 can electrically couple the first processor board 17 to the second processor board 19. Position data from a fourth articulating joint 26 and a fifth articulating joint 34 can be digitized on a third processor board 27 in the second transfer member 20. A second slip ring 25 can be positioned in the second transfer member to electrically couple the digitized signals being sent from the first and second processor boards 17, 19 with the third processor board. Position data from a sixth articulating joint 36 can be digitized on a fourth processor board 37 in the third transfer member 30. A third slip ring 35 can be positioned in the third transfer member 30 to electrically couple the digitized signals from the first, second, and third processor boards 17, 19, 27 with the fourth processor board 37.

The slip rings 15, 25, 35, in some embodiments, can be substantially similar to the slip ring assemblies described in U.S. Pat. No. 5,829,148 issued on Nov. 3, 1998. In other embodiments, different slip ring assemblies (e.g., commercially available slip rings) can be used to electrically couple the processor boards 17, 19, 27, 37. In still other embodiments, no slip rings 15, 25, 35 are present.

Figure 3:
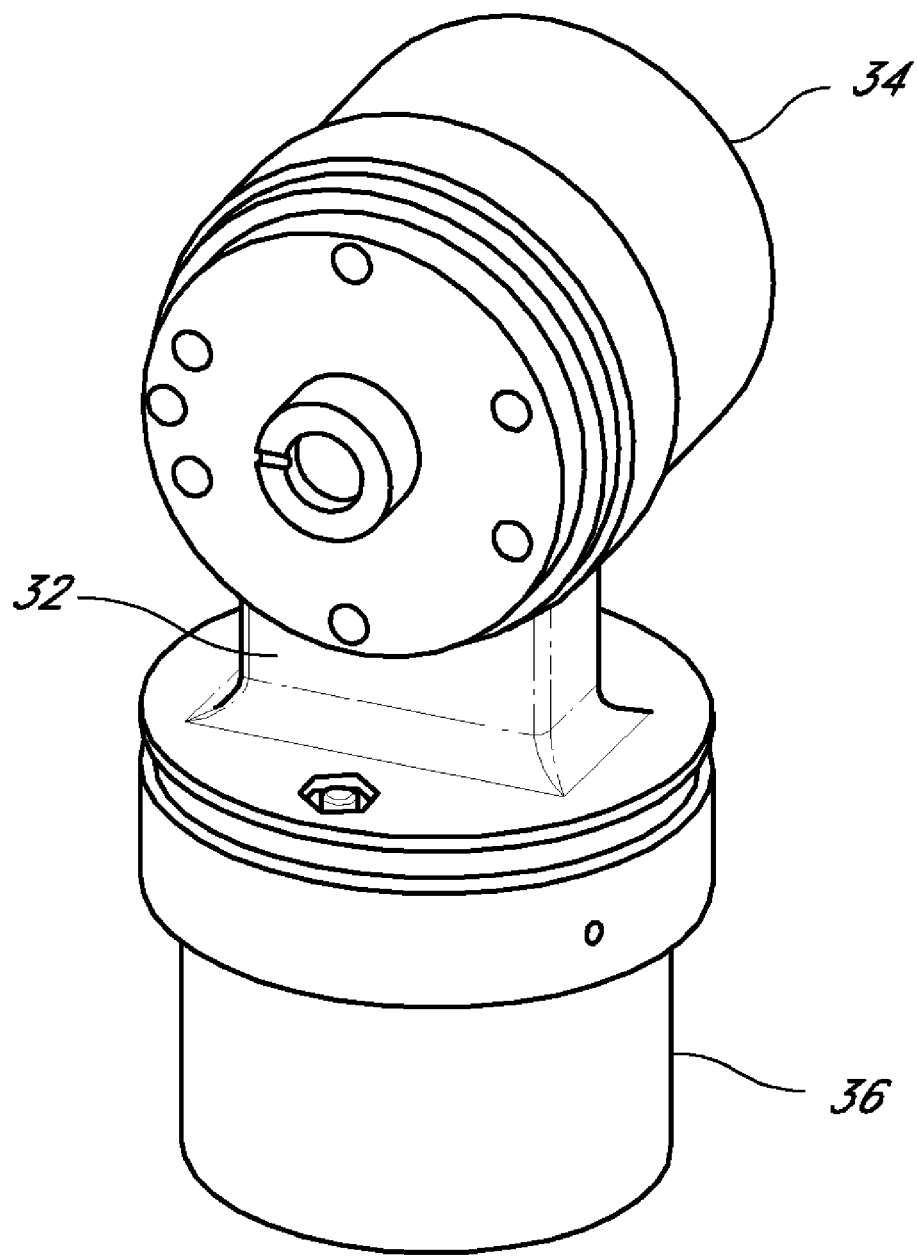
FIG. 3 is an enlarged perspective view of an joint assembly of the coordinate measuring machine of FIG. 1.
Figure 4:
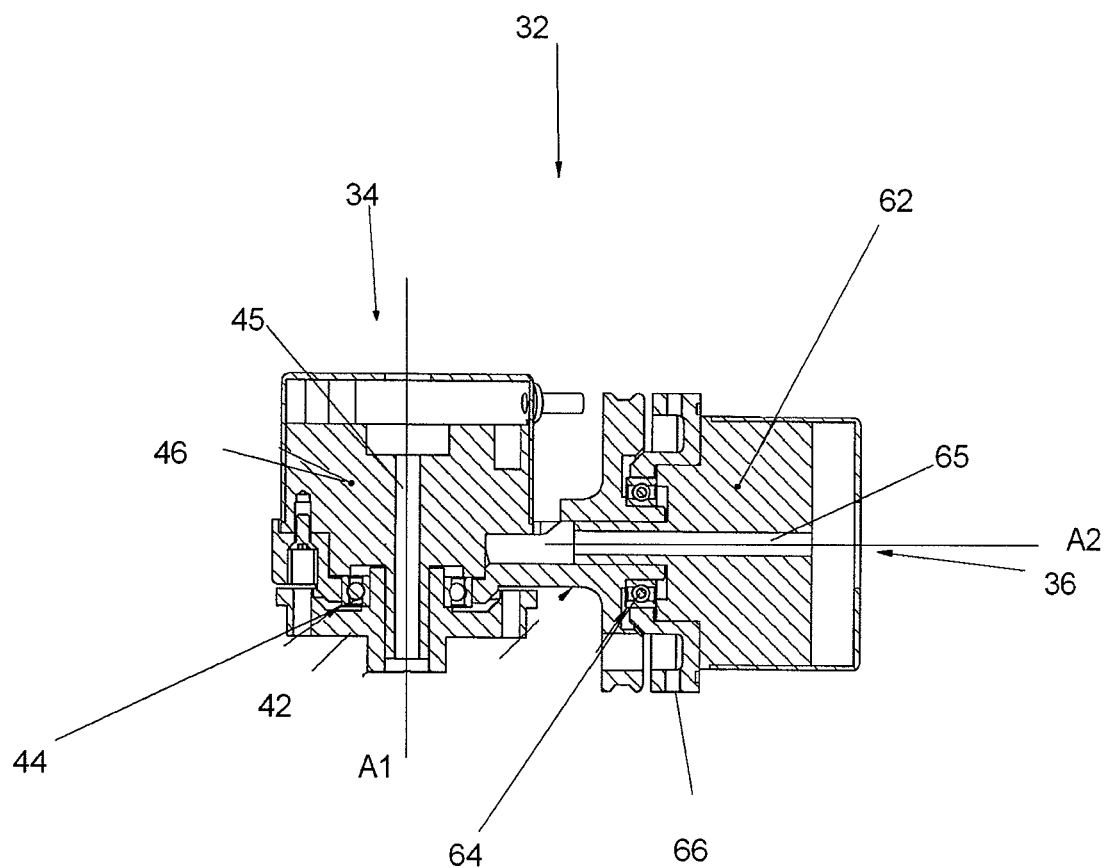
FIG. 4 is a cross-sectional view of the joint assembly of FIG. 3.
Figure 5:
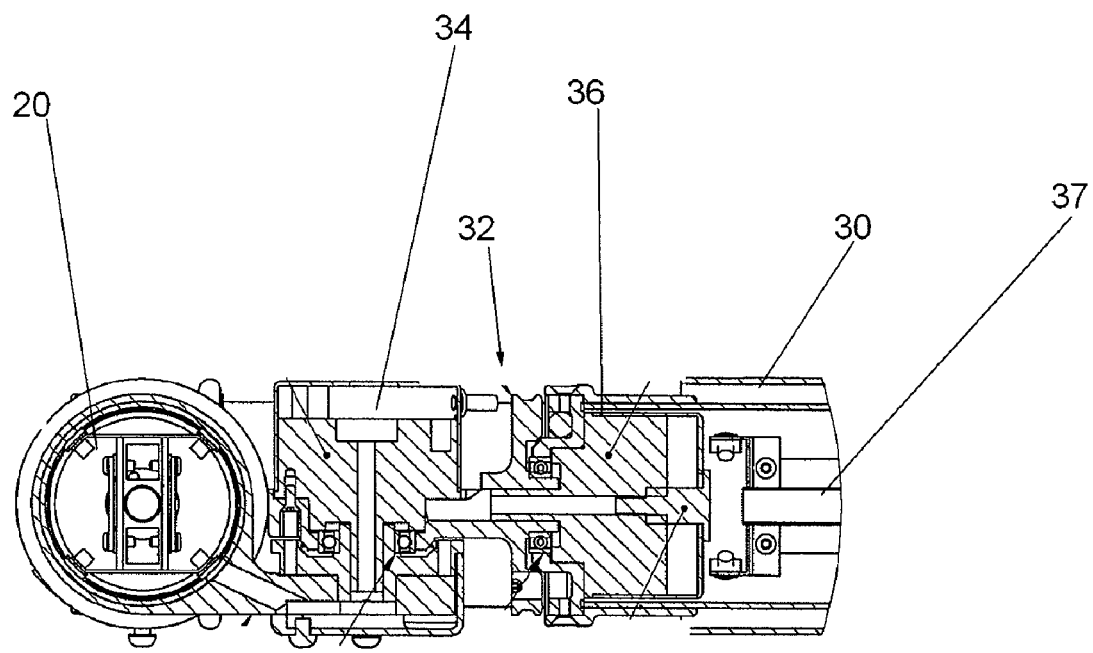
FIG. 5 is a cross-sectional view of an joint assembly of the coordinate measuring machine of FIG. 1 including transfer members attached thereto.

With reference to FIGS. 3-5, an articulating joint assembly 32 is illustrated. In the illustrated embodiment, the illustrated articulating joint assembly 32 is the third articulating joint assembly 32, coupling the second transfer member 20 to the third transfer member. In the illustrated embodiments, the articulating joint assemblies 12, 22, 32 are substantially similar to one another. In other embodiments, the articulating joint assemblies 12, 22, 32 can be different from one another.

With reference to FIG. 3, a perspective view of the third articulating joint assembly 32 is illustrated. The third articulating joint assembly 32 includes two articulating joints 34, 36 arranged such that axes of rotation A1, A2 (FIG. 4) defined by each of the joints 34, 36 are transverse to one another, and desirably such that axes of rotation defined by each of the joints 34, 36 are substantially perpendicular to one another.

FIGS. 4 and 5 illustrate cross sectional views of the articulating joint assembly 32. FIG. 5 illustrates the transfer members 20, 30 rotatably coupled by the articulating joint assembly 32. In the illustrated embodiment, each articulating joint 34, 36 includes a rotatable portion 42, 62, a rotatably fixed portion 46, 66, and a bearing surface 44, 64, therebetween. In the illustrated embodiment, each articulating joint 34, 36 also includes a shaft 45, 65 defining an axis of rotation A1, A2 of the joint. In the illustrated embodiment, each articulating joint 34, 36 includes an optical encoder therewith.

With reference to FIG. 5, in the illustrated embodiment, the fixed portion 66 of an articulating joint 36 is coupled to the third transfer member 30 with screws, bolts, or another fastener or adhesive. The rotatable portion 62 extends into the third transfer member 30 and is coupled to the fixed portion 46 of the other articulating joint 34 forming the articulating joint assembly 32. The rotatable portion 42 of articulating joint 34 is coupled to the second transfer member 20 with screws, bolts, or some other fastener or adhesive.

With continued reference to FIG. 5, in the illustrated embodiments, encoders on the third articulating joint assembly, positioned between the second transfer member and the third transfer member generate signals corresponding to the relative angle formed between the second transfer member and the third transfer member, and the rotational displacement (swiveling motion) between the second transfer member and the third transfer member. Likewise, with reference to FIG. 2, in the illustrated embodiment, encoders on the second articulating joint assembly 22, positioned between the first transfer member 10 and the second transfer member 20, generate signals corresponding to the relative angle formed therebetween, and the rotational displacement therebetween. In the illustrated embodiment, encoders on the first articulating joint assembly 12, positioned between the first transfer member 10 and the coordinate acquisition device 5, generate signals corresponding to the relative angle formed therebetween, and the rotational displacement therebetween. Accordingly, with reference to FIGS. 2-5, in embodiments of PCMM 2 having articulating joint assemblies 12, 22, 32 illustrated herein, the tubular members forming the transfer members 10, 20, 30 are rotationally fixed with respect to longitudinal axes defined thereby.

With continued reference to FIGS. 2-5, it is noted that the articulating joints forming the articulating joint assemblies are relatively short with respect to the transfer members. Advantageously, these relatively short articulating joint assemblies can be used in where the transfer members comprise single walled tubes, as described above. Moreover, relatively short articulating joint assemblies can use a single bearing surface 44, 64 per degree of freedom of movement. Advantageously, this single bearing surface can reduce parts count, manufacturing complexity, and cost over an articulating joint assembly having a longer articulated length which can require multiple bearing surfaces. Accordingly, as compared to the '148 patent referenced above, the illustrated arrangement advantageously can utilize less bearings. Specifically, the transfer remembers in the '148 include bearings at each end of the double walled tubes. In the illustrate arrangement, less bearings can be used and thus manufacturing complexity and costs can be reduced.

Figure 6:
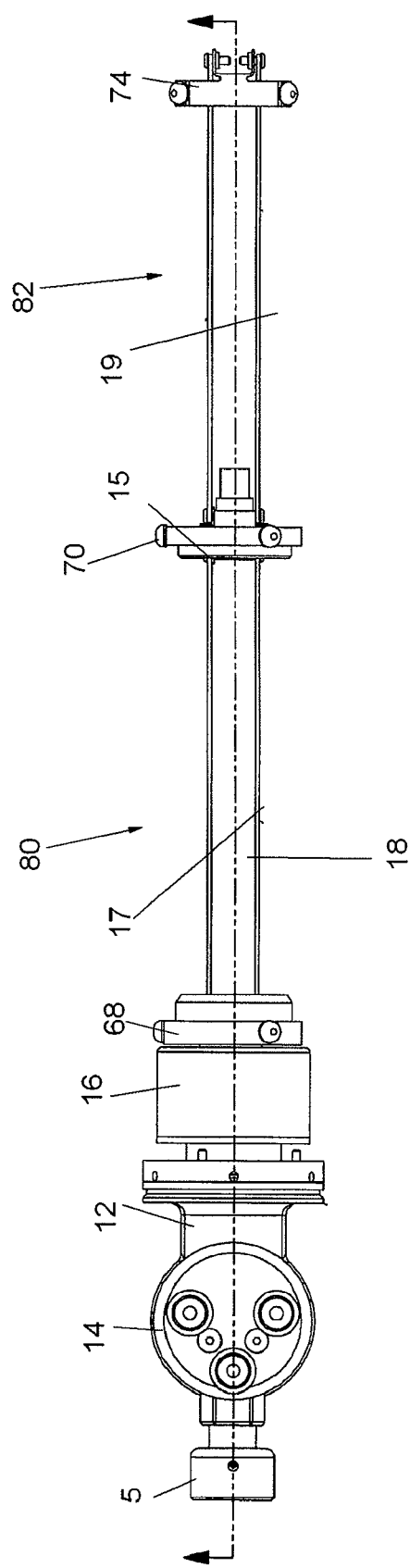
FIG. 6 is a perspective view of a board assembly and an articulating member assembly of the coordinate measuring machine of FIG. 1.
Figure 7:
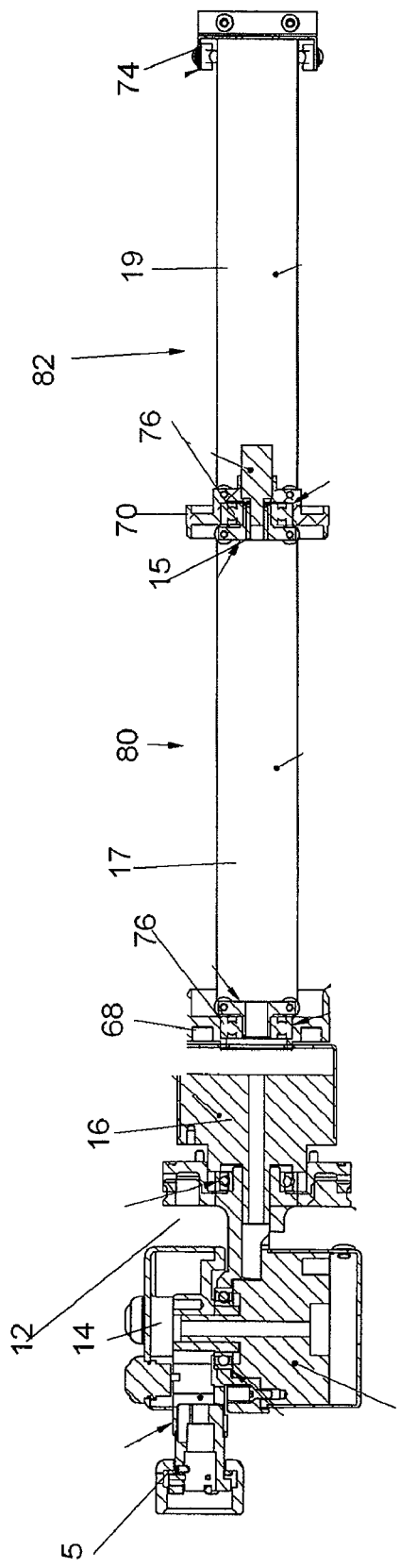
FIG. 7 is cross-sectional view of the board assembly and articulating member assembly of FIG. 6.

With reference to FIGS. 6 and 7, a first board assembly 18 is illustrated. In the illustrated embodiment, the first board assembly 18 is positioned in the first transfer member such that encoders can be coupled with processor boards as described above with respect to FIG. 2.

FIG. 6 illustrates a perspective view of the first board assembly 18. The board assembly 18 comprises a rotatable portion 80 and a rotatably fixed portion 82. The rotatable portion 80 is coupled to a rotatable portion of articulating joint 16 such that rotation about the axis of articulating joint 16 rotates the rotatable portion 80 of the board assembly 18. In the illustrated embodiment, the rotatable portion of the articulating joint 16 is coupled to a fixed portion of articulating joint 14. Accordingly, as illustrated, the rotatable portion 80 of the board assembly 18 is rotatably fixed with respect to articulating joint 14.

As described above, the rotatable portion 80 can have a processor board 17 disposed thereon. The processor board 17 rotates with the rotation of the rotatable portion 80. Accordingly, since in the illustrated embodiment the rotatable portion 80 is rotatably fixed with respect to articulating joint 14, a signal generated by the encoder of articulating joint 14 can be digitized on the first processor board 17 without first passing through a slip ring.

With reference to FIG. 7, a cross-sectional view of the first processor board assembly 18 is illustrated. As illustrated, the processor board assembly 18 comprises a first bracket 68, a second bracket 70, and a third bracket 74 that can be mounted to the first transfer member 10, such as with removable fasteners. In the illustrated embodiments, each of the brackets comprises a plurality of mount points substantially angularly evenly spaced about the bracket so as to conform to an inner surface of a generally cylindrical transfer member. In other embodiments, the brackets can have different numbers or configurations of mount points, which can correspond to geometries of non-cylindrical transfer members. The rotatable portion 80 of the board assembly 18 can be rotatably coupled to the first and second brackets 68, 70 with bearings 76. The rotatably fixed portion 82 of the first board assembly can be coupled to the second and third brackets 70, 74.

With continued reference to FIG. 7, in the illustrated embodiment, a slip ring 15 electrically couples the rotatable portion 80 of the first board assembly 18 to the rotatably fixed portion 82. The slip ring 15 allows infinite rotation between the rotatable portion 80 and the non rotatable portion 82 of the first board assembly 18 while maintaining electrical contact therebetween. Accordingly, a signal that has been digitized by the first processor board 17 can be transmitted through over the slip ring 15 without worry of analog signal attenuation.

In some embodiments, the second and third board assemblies 28, 38 can be substantially similar to the rotatably fixed portion 82 of the first board assembly 18. In some embodiments, one or both of the second and third board assemblies 28, 38 can have rotatable portions similar to those described with respect to the first processor board assembly 18.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while the number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for, one another in order to perform varying modes of the disclosed invention. Thus, it is intended that the scope of the present invention herein disclosed should not be limited by the particular disclosed embodiments described above, but should be determined only by a fair reading of the claims.

What is claimed is:

1. A coordinate measurement machine comprising:
    a first transfer member;
    a second transfer member;
    a probe;
    a first joint assembly rotatably coupling the first transfer member to the probe and defining at least one axis of rotation, the first joint assembly comprising an encoder for the at least one axis of rotation, the encoder configured to generate a signal corresponding to rotation of the first joint assembly about the axis of rotation;
    a second joint assembly rotatably coupling the first transfer member to the second transfer member and defining at least one axis of rotation, the second joint assembly comprising an encoder for the at least one axis of rotation, the encoder configured to generate a signal corresponding to rotation of the second joint assembly about the axis of rotation;
    a first board assembly positioned in the first transfer member, wherein at least a first portion of the first board assembly is rotatable relative to the first transfer member and a second portion that is rotationally fixed relative to the first transfer member;
    a first processor board mounted on the rotatable portion of the first board assembly, the first processor board adapted to receive the signal generated by the encoder of the first joint assembly or the encoder of the second joint assembly and to process said signal; and
    a second processor board mounted on the rotationally fixed portion of the first board assembly.

2. The coordinate measurement machine of claim 1, wherein the second joint assembly comprises at least two encoders and the second processor board is adapted to receive a signal from the at least one other encoder of the second joint assembly and to process said signal.

3. The coordinate measurement machine of claim 1, further comprising a slip ring assembly electronically coupling the first portion of the board assembly to the second portion of the board assembly and wherein the first processor board is operatively coupled to the second processor board through the slip ring assembly.

4. The coordinate measurement machine of claim 1, further comprising:
    a third transfer member; and
    a third joint assembly rotatably coupling the second transfer member to the third transfer member and defining at least one axis of rotation, the third joint assembly comprising an encoder for each of the at least one axis of rotation, the encoder configured to generate a signal corresponding to rotation of the third joint assembly about the axis of rotation.

5. The coordinate measurement machine of claim 4, wherein each of the first joint assembly, the second joint assembly, and the third joint assembly allow substantially infinite rotation about the axes of rotation defined thereby.

6. The coordinate measurement machine of claim 1, wherein the first joint rotatably couples the first transfer member to the probe about two axes of rotation.

7. The coordinate measurement machine of claim 6, wherein the second joint assembly rotatably couples the second transfer member to the first transfer member about two axes of rotation.

8. A transfer member for a coordinate measurement machine comprising:
    a generally tubular member; and
    a board assembly mounted within the tubular member, the board assembly comprising:
        a first board support adapted to receive a printed circuit board;
        a second board support adapted to receive a printed circuit board and rotatably coupled to the first board support; and
        a slip ring electrically coupling the first board support to the second board support.

9. The transfer member of claim 8, wherein the first board support is rotatable relative to the generally tubular member and the second board support is fixed relative to the generally tubular member.

10. The transfer member of claim 9, wherein the board assembly comprises a bearing rotatably coupling the first board support to the generally tubular member.

11. The transfer member of claim 8, further comprising a first printed circuit board positioned on the first board support, and a second printed circuit board positioned on the second board support, each printed circuit board being adapted to receive and process signals from encoders that can be electronically coupled to the printed circuit boards.

12. The transfer member of claim 11, wherein at least one of the first printed circuit board and the second printed circuit board is capable of processing signal information from two encoders simultaneously.

13. A coordinate measurement machine comprising:
   a probe;
   a first transfer member;
   a first joint assembly rotatably coupling the probe to the first transfer member, the first joint assembly comprising at least one encoder configured to generate a signal corresponding to a degree of rotation of the first joint assembly;
   a second transfer member;
   a second joint assembly rotatably coupling the first transfer member to the second transfer member, the second joint assembly comprising at least one encoder configured to generate a signal corresponding to a degree of rotation of the second joint assembly;
   a third transfer member;
   a third joint assembly rotatably coupling the second transfer member to the third transfer member, the second joint assembly comprising at least one encoder configured to generate a signal corresponding to a degree of rotation of the third joint assembly;
   a base coupled to the third transfer member;
   a first processor board assembly positioned within the first transfer member, the first processor board assembly comprising a first processor board operatively coupled to the encoder of the first joint assembly and a second processor board operatively coupled to the encoder of the second joint assembly; and
   a second processor board assembly positioned within the second transfer member, the second processor board assembly comprising a third processor board operatively coupled to the encoder of the third joint assembly.

14. The coordinate measurement machine of claim 13, wherein each of the first joint assembly, the second joint assembly, and the third joint assembly defines two axes of rotation, and each of the first joint assembly, the second joint assembly, and the third joint assembly comprises two encoders, each encoder adapted to generate a signal corresponding to an amount of rotation of the joint about one axis of rotation.

15. The coordinate measurement machine of claim 14, further comprising a third processor board assembly within the third transfer member, the third processor board assembly comprising a fourth processor board operatively coupled to one of the encoders of the third joint assembly.

16. The coordinate measurement machine of claim 15, wherein the first processor board is operatively coupled to an encoder of the first joint assembly, the second processor board is operatively coupled to an encoder of the first joint assembly and an encoder of the second joint assembly, and the third processor board is operatively coupled to an encoder of the second joint assembly and an encoder of the third joint assembly.

17. The coordinate measurement machine of claim 13, wherein each of the first joint assembly, the second joint assembly, and the third joint assembly allow substantially infinite rotation about the axes of rotation defined thereby.

* * * * *